June 29, 1965　　　G. P. WHITNEY　　　3,192,004

HANDLING APPARATUS

Filed April 16, 1963

INVENTOR.
George P. Whitney
BY
Mueller & Aichele
Attys.

3,192,004
HANDLING APPARATUS
George P. Whitney, Villa Park, Ill., assignor to Motorola, Inc., Franklin Park, Ill., a corporation of Illinois
Filed Apr. 16, 1963, Ser. No. 273,414
4 Claims. (Cl. 312—244)

This invention relates to handle assemblies, and more particularly to an improved two position handle assembly for carrying portable objects.

Two position handles for carrying portable objects are often desirable from the standpoint of consumer appeal and ease of storage. Such handles are mounted on the object to be moved and may be raised when in use and retracted or lowered when not in use to present a neat appearance and a compact object for storage. It is desirable that such a handle be stable in both positions so that the user need not withdraw the handle from its retracted position every time he wishes to use it. Heretofore, such handles having two stable positions have often been of complicated construction and susceptible to vibration when in one or both positions.

Accordingly, it is an object of this invention to provide a simple and improved two position handle which utilizes a minimum of parts, and is easily assembled.

Another object of the invention is to provide a retractable handle which is stable in both the retracted position and the position for use, and which may be manually withdrawn to the position for use.

Still another object of the invention is to provide a two position handle which is spring biased in both positions so that vibration is substantially reduced.

A feature of the invention is the provision of a handle assembly with a gripping portion and a support member which is movable in an opening in an enclosure and the further provision of a bowed spring attached to the interior end of the support member to provide two stable positions for the gripping portion.

Another feature of the invention is the provision of a handle assembly with a gripping portion and a pair of support members movable in corresponding openings in an enclosure, and the further provision of a flat spring inside the enclosure extending between the support members, which flat spring is of an effective length greater than the distance between the support members.

Still another feature of the invention is the provision, in the above handle assembly, of a bearing plate having an interior extension attached to the center of the spring, and of stop means on the support members limiting movement resulting from the bias of the spring.

In accordance with the invention a handle assembly is provided for a portable television receiver. The housing for the receiver includes a pair of openings at the top thereof. A handle with a gripping portion includes a pair of support members extending from the gripping portion through the openings in the enclosure. The support members are movable in the openings to permit the gripping portion to move toward and away from the enclosure. A flat spring is anchored at the center therof to the top of the enclosure and has its ends connected to the interior ends of the support members. The length of the flat spring is greater than the distance between the support members so that the spring must be bowed between the ends thereof. The bow in the spring will hold the support members either upwardly so that the gripping portion extends above the housing, or downwardly so that the gripping portion will be adjacent to the housing. The handle is stable in both positions because of the flexure of the spring.

Figure 1:
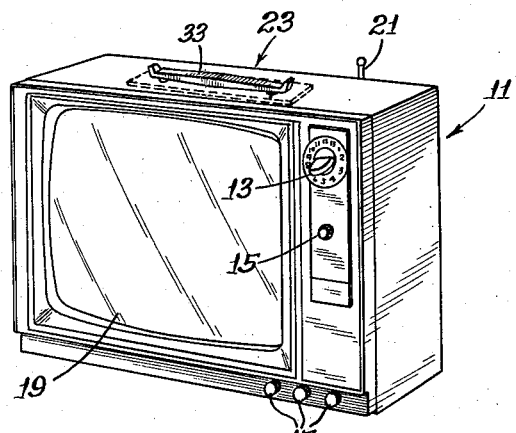
FIG. 1 is a perspective view of a television receiver including the handle assembly of the invention.

Referring now to FIG. 1, there is shown a portable television receiver 11 with appropriate controls 13, 15 and 17, and with a viewing screen 19. A monopole antenna 21 may be seen in retracted position on the back of the receiver. A carrying handle assembly 23 is mounted on the top panel 25 of receiver 11 to facilitate the portability of the receiver.

Figure 3:
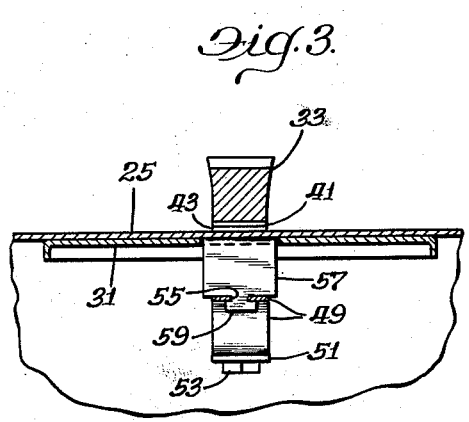
FIG. 3 is a sectional view taken along the line 3—3 of FIG. 2.
Figure 2:
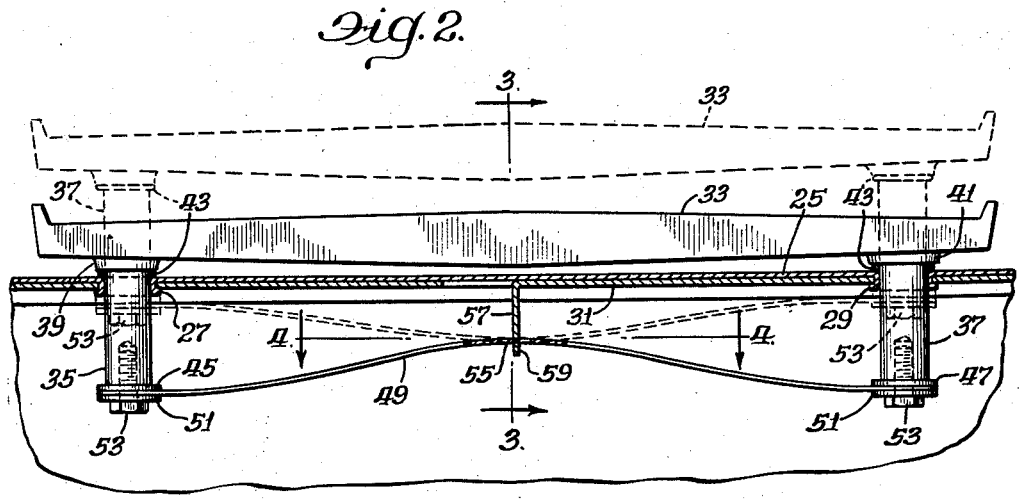
FIG. 2 is a front elevation of the handle assembly of FIG. 1, partially in section.
Figure 4:
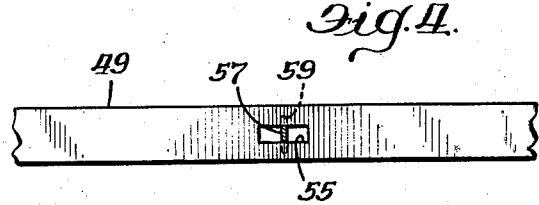
FIG. 4 is a sectional view taken along the line 4—4 of FIG. 2.

Referring now to FIGS. 2 through 4, the construction of handle assembly 23 is more clearly shown. The top panel 25 of television receiver 11 includes a pair of openings in the top panel 25 with bosses 27 and 29 extending inwardly therefrom. A bearing plate 31 is fitted over the inwardly extending bosses 27 and 29 and is secured to the interior surface of top panel 25 by the turned over ends of the bosses.

The handle itself includes a gripping portion 33 and a pair of support members 35 and 37. Members 35 and 37 extend through the openings formed in top panel 25 by bosses 27 and 29, and into the interior of the television receiver 11. Shoulders 39 and 41 are provided at the juncture between gripping portion 33 and support members 35 and 37 respectively. Shoulders 39 and 41 together with ring washers 43 provide a stop to limit the downward movement of members 35 and 37.

The opposite ends of members 35 and 37 have stop washers 45 and 47, respectively, secured thereto. These washers bear against the inward ends of bosses 27 and 29 to limit the upward movement of the handle assembly. A leaf spring 49 is secured at its respective ends to the inward ends of support members 35 and 37 by means of clamp washers 51 and bolts 53. The center of spring 49 has a slot 55 formed therein (FIG. 4), and an extension 57 formed in bearing plate 31 has a T lug 59 thereon (FIG. 3) which cooperates with slot 55 to anchor the center portion of spring 49 to extension 57.

As may be seen clearly in FIG. 2, spring 49 is of an effective length greater than the distance between support members 35 and 37. Accordingly, the spring is bowed and provides bistable action as may be seen from the position shown in dotted lines. If the effective length of spring 49 is sufficiently long with respect to the distance between members 35 and 37, spring 49, in either of its two stable positions, will load the handle in place with a bias force. That is, in the position shown in solid lines spring 49 will hold shoulders 39 and 41 and ring washers 43 against the surface of top panel 25 with sufficient force to inhibit vibration. Similarly, when spring 49 is in the position shown in dotted lines, shoulders 45 and 47 will bear against bosses 27 and 29 with sufficient force to also inhibit vibration in this position.

It may therefore be seen that the invention provides a two position handle which may be manually raised to a stable extended position by a user and may be pushed into a stable retracted position. When in retracted position the unit is more attractive and storage is made easier because the handle does not project as far from the receiver. The complete assembly is simple of construction and provides reliable, vibration free operation with a minimum of parts.

I claim:
1. A handle assembly to facilitate the portability of a housing having an opening therein, including in combination, a handle having a gripping portion and further having rigid support means attached to said gripping portion, said support means extending into the interior of the housing through the opening therein and being movable there- in to permit variance of the distance between said gripping portion and the housing, and a bowed flat spring in the interior of the housing, said flat spring having a pair of end portions and a center portion therebetween, said flat spring being fixed to said housing with said pair of end portions being displaceable relative to said center portion, said support means being secured to at least one of said portions to be displaced thereby with respect to the housing, whereby said gripping portion is movable to two stable positions of differing distances from the housing.

2. Apparatus to facilitate handling of enclosable equipment, including in combination, an enclosure for the equipment and having a top portion with a pair of openings formed therein, a handle having a gripping portion and further having a pair of rigid support members attached at either end of said gripping portion, said support members extending into the interior of the enclosure through said openings and being movable therein to permit variance of the distance between said gripping portion and said top portion, and a flat spring extending between said support members with its ends attached thereto, said flat spring having an intermediate portion anchored with respect to said enclosure and being of greater effective length than the distance between said support members thereby providing bistable action, whereby said gripping portion is movable to two stable positions of differing distances from said top portion of said enclosure.

3. Apparatus to facilitate handling of electronic equipment, including in combination, a housing for the electronic equipment and having a top portion with a pair of openings formed therein, a handle having a gripping portion having a pair of rigid support members attached at either end, a bearing plate secured to the underside of said top portion and having openings therein coincident with said openings in said top portion, said support members extending into the interior of said housing through said openings and being movable therein between first and second positions to permit variance of the distance between said gripping portion and said top portion, mounting means extending from said bearing plate in the interior of said housing, and a flat spring having a center portion and a pair of end portions, said end portions being attached to respective ones of said support means, said flat spring being of greater effective length than the distance between said support means, said center portion being anchored to said mounting means at a distance from said top portion intermediate the distance therefrom of said end portions when said support means are in said first and second positions respectively, thereby providing bistable action to move said gripping portion between two stable positions of differing distances from said top surface of said housing.

4. Apparatus to facilitate handling of electronic equipment, including in combination, a housing for the electronic equipment and having a top member with a pair of openings formed therein, a handle having a gripping portion on the exterior of said housing and further having a pair of rigid support members attached at either end of said gripping portion, a bearing plate secured to the interior side of said top member and having openings therein corresponding with said openings in said top member, said support members extending into the interior of the housing through said openings and being movable therein to permit variance of the distance between said gripping portion and said top member, stop means on said support members confining the movement thereof within predetermined limits, an extension disposed inwardly from said bearing plate, and a flat spring having a center portion and a pair of end portions, said end portions being fixed to respective ones of said support members and being movable therewith, said center portion being anchored to said extension at a point intermediate the limits of movement of said end portions, said flat spring being of an effective length greater than the distance between said support members to provide bistable action and being of sufficient length to resiliently retain said support members against said stop means at each limit of the predetermined distance of movement, whereby said gripping portion is movable to two stable spring loaded positions of differing distances from said top member of said housing.

References Cited by the Examiner
UNITED STATES PATENTS

| | | | |
|---|---|---|---|
| 337,412 | 3/86 | Long | 16—115 |
| 674,820 | 5/01 | Wilhite | 16—115 X |
| 1,283,368 | 10/18 | Turchin | 312—244 X |
| 1,875,121 | 8/32 | Olson | 5—345 |
| 1,958,587 | 5/34 | Mitchell | 5—345 X |
| 2,966,066 | 12/60 | Looker | 267—1 |

FRANK B. SHERRY, *Primary Examiner.*

CHANCELLOR E. HARRIS, *Examiner.*